3,557,108
PHTHALAZINO-PHTHALAZINEDIONES AND
PROCESS FOR THEIR MANUFACTURE
Elvio Bellasio, Albate, Italy, Emilio Testa, Vacallo, Switzerland, and Giulio Maffii and Pierfranco Schiatti, Milan, Italy, assignors to Lepetit S.p.A.-Gruppo per la Ricerca Scientifica e la Produzione Chimica Farmaceutica, Milan, Italy
No Drawing. Filed Jan. 16, 1968, Ser. No. 698,139
Claims priority, application Great Britain, Feb. 1, 1967,
4,842/67
Int. Cl. C07d 51/06
U.S. Cl. 260—250    4 Claims

ABSTRACT OF THE DISCLOSURE

The present application is concerned with phthalazino-[2,3-b]phthalazine - 5(14H),12(7H) - diones. The compounds are prepared starting from 1,2-diacetyl-hydrazine and a 2-bromomethyl-benzoyl chloride. Their pharmacological activity, as antiinflammatory agents, is also described.

This invention is concerned with a new class of compounds and with a method for preparing them. More particularly the compounds of the invention are phthalazino-[2,3-b]phthalazine-5(14H),12(7H)-diones of the following formula

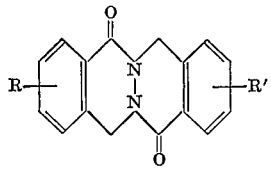

wherein R is a member of the class consisting of hydrogen, halogen and nitro groups, R' is a member of the class consisting of hydrogen, halogen, nitro and amino groups.

The process for preparing the compounds of the invention consists in condensing a 2-bromomethyl-benzoyl chloride of Formula I, wherein R has the above significance, with 1,2-diacetyl-hydrazine in an anhydrous organic solvent, in the presence of an organic nitrogen base. The starting compounds are made to react in about equimolecular amounts, except for the base which is used in an at least double molecular amount in respect of the other reactants. The resulting 2,3-diacetyl-3,4-dihydro-1(2H)-phthalazinone (II) is hydrolized to the corresponding 3,4-dihydro-1(2H)-phthalazinone. This latter compound is then reacted with an equimolecular amount of a 2-bromomethyl-benzoyl chloride of Formula IV, wherein R" is a member of the class consisting of hydrogen, halogen, nitro and acetamido groups, in the presence of an organic nitrogen base, to give a phthalazino[2,3-b]phthalazine-5(14H),12(7H)-dione of Formula V. When R" is acetamido, compound V is hydrolized by conventional methods to the corresponding unsubstituted-amino compound VI.

The process can be represented as follows:

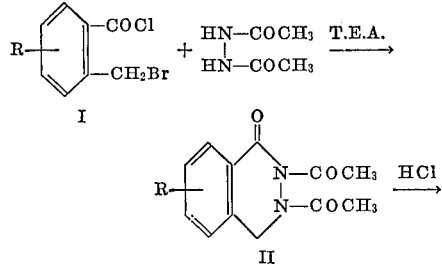

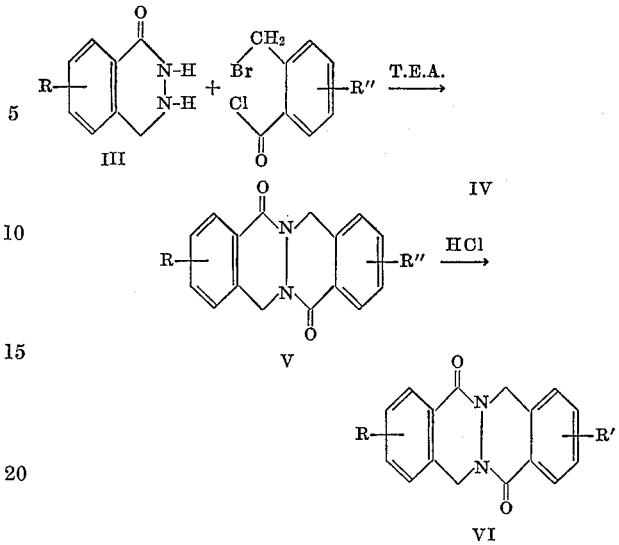

The compounds of the invention show a high antiinflammatory activity, which was evaluated through their ability in decreasing the carrageenin induced edema in the rat.

We used for our experiments Wistar female rats, weighing between 120 and 150 g. The compounds were administered suspended or dissolved in a 10% acacia gum solution by oral route. The results obtained are summarized in the following Table 1, in comparison with a well known anti-inflammatory agent, i.e. phenylbutazone. The toxicity is also reported for a better evaluation of the safety of the therapeutic index. It is apparent that said index is largely in favour of the compounds of the invention in comparison with phenylbutazone.

TABLE 1

| Compound of example— | $LD_{50}$ mg./kg. mice, os | Dose, mg./kg. rats, os | Carrageenin edema percent decrease |
|---|---|---|---|
| 1 | 1,000 | 100 | −38 |
| 2 | 1,000 | 100 | −43.3 |
| Phenylbutazone | 286 | 90 | −39.7 |

The following nonlimitative examples illustrate the invention.

EXAMPLE 1

Preparation of phthalazino[2,3-b]phthalazine-
5(14H),12(7H)-dione

A suspension of 22.4 g. of 1,2-diacetyl-hydrazine in 600 ml. of anhydrous dioxane is heated at 80° C. until solution is complete, then a solution of 45.4 g. of 2-bromomethyl-benzoyl chloride in the same solvent is slowly added, followed by a dropwise addition of 39.2 g. of triethylamine. The reaction mixture is kept between 80 and 90° C. for two hours, while stirring, then is cooled and filtered. The solution is concentrated in vacuo to dryness, the residue is taken up with water, and the aqueous phase extracted with chloroform. By evaporating the chloroform a residue is formed, which is recrystallized from benzene. Thirty grams of 2,3-diacetyl-3,4-dihydro-1(2H)-phthalazinone are obtained. M.P. 160–162° C.

An amount of 20 g. of the above compound is suspended in 200 ml. of a 10% hydrochloric acid solution, and refluxed for five minutes. After cooling, the solution is neutralized with sodium bicarbonate and repeatedly extracted with chloroform. The combined chloroform extracts are evaporated and the remaining residue is recrystallized from ethanol. This is 3,4-dihydro-1(2H)-phthalazinone. Yield 7 g. M.P. 170° C. An amount of 14.8 g.

of 3,4-dihydro-1(2H)-phthalazinone is dissolved in a mixture of 100 ml. of benzene and 30 ml. of dioxane, by stirring. The solution is cooled to 15° C.; then 23.3 g. of 2-bromomethyl-benzoyl chloride, dissolved in 20 ml. of benzene, are added drop by drop. To this solution, previously cooled to 0° C., 24.2 g. of triethylamine, dissolved in 10 ml. of benzene, are added, and the mixture is heated to 50° for 2½ hours. After cooling to room temperature, the mixture is washed first with dilute hydrochloric acid, then with a saturated aqueous solution of sodium bicarbonate. The aqueous layer is discarded, and the organic phase is concentrated to dryness. The residue is recrystallized from ethanol. This is phthalazino[2,3-b]phthalazine-5(14H),12(7H)-dione. Yield 19.8 g. (75%), M.P. 226–227° C.

*Analysis.*—Calculated for $C_{16}H_{12}N_2O_2$ (percent): C, 72.71; H, 4.58; N, 10.60. Found (percent): C, 72.52; H, 4.65; N, 10.49.

EXAMPLE 2

Preparation of 10-amino-phthalazino [2,3-b]phthalazine-5(14H),12(7H)-dione

An amount of 37 g. of 6-amino-phthalide is refluxed with 200 ml. of acetic anhydride for 0.5 hour and allowed to stand overnight. The mixture is then cooled at 0° C. for one hour and filtered. The crystals are collected, washed with water and dried in vacuo. An amount of 18 g. of 6-acetamindo-phthalide is obtained, M.P. 226–228° C.

To 200 ml. of acetic acid, previously saturated with hydrogen bromide, a suspension of 15.6 g. of 6-acetylamino-phthalide in 100 ml. of acetic acid is added. The mixture is allowed to stand 2 hours at room temperature, then heated to 60–65° C. for 12 hours, then again allowed to stand at room temperature for 2 days. The mixture is poured into ice water, the precipitate is collected by filtering, and recrystallized from ethyl acetate-ethanol 100:30. Five grams of 5-acetamido-2-bromomethyl-benzoic acid are obtained, M.P. 139–140° C.

An amount of 25.6 g. of the above compound is suspended in 200 ml. of thionyl chloride. After heating at 50° for 1 hour, the excess of thionyl chloride is distilled off. The residue, consisting of crude 5-acetamido-2-bromomethyl-benzoyl chloride, is dissolved in 30 ml. of benzene and added dropwise to a solution of 14.8 g. of 3.4-dihydro-1(2H)-phthalazinone in a mixture of 100 ml. of benzene and 30 ml. of dioxane. The solution is cooled to 0° C., then 24.2 g. of triethylamine, dissolved in 10 ml. of benzene are added. The mixture is kept at 50° C. for 3 hours, cooled to room temperature, and washed first with dilute hydrochloric acid then with a saturated aqueous solution of sodium bicarbonate. The organic phase is separated and concentrated to dryness in vacuo. The half solid residue consisting of crude 10-acetamido-phthalazino[2,3-b]phthalazine - 5(14H),12(7H)-dione is suspended and refluxed for 0.5 hour in 100 ml. of dilute hydrochloric acid. The liquid is allowed to cool and the precipitated crystals are collected and recrystallized from water. This is 10-amino-phthalazino[2,3-b]phthalazine-5(14H),12(7H)-dione hydrochloride. Yield 22.0 g. (70%) M.P. 275–277° C.

*Analysis.*—Calc. for $C_{16}H_{13}N_3O_2HCl$ (percent): C, 60.85; H, 4.46; N, 13.30; Cl, 11.22. Found (percent): C, 60.86; H, 4.64; N, 13.08; Cl, 11.45.

EXAMPLE 3

Preparation of 10-nitro-phthalazino[2,3-b]phthalazine-5(14H),12(7H)-dione

A solution of 50 g. of 6-nitro-phthalide in 250 ml. of acetic acid, is added to a solution of 400 ml. of acetic, previously saturated with hydrogen bromide. The liquid is stirred at room temperature for 2 hours, then is heated at 70° for 8 hours. After cooling, the mixture is poured into a mixture of 2 kg. of ice and water. The precipitate is collected by filtering and recrystallized from benzene. This is 2-bromomethyl-5-nitro-benzoic acid. Yield 46.4 g., M.P. 124–127° C.

The process is then continued substantially as described under Example 2.

From 7.0 g. of 3,4-dihydro-1(2H)-phthalazinone and 13.1 g. of 2-bromomethyl-5-nitro-benzoyl chloride, 12 g. (82.4%) of 10 - nitro - phthalazino[2,3-b]phthalazine-5-(14H),12(7H)-dione are obtained. M.P. 233–234° C.

*Analysis.*—Calc. for $C_{16}H_{11}N_3O_4$ (percent): C, 62.13; H, 3.59; N, 13.59. Found (percent): C, 61.80; H, 3.81; N, 13.35.

EXAMPLE 4

Preparation of 10-fluoro-phthalazino[2,3-b]phthalazine-5(14H),12(7H)-dione

Prepared substantially according to the process described under Example 2.

From 6.02 g. of 3,4-dihydro-1(2H)-phthalazinone and 10.2 g. of 2-bromomethyl-5-fluoro-benzoyl chloride, 8.0 g. (70%) of 10 - fluoro - phthalazine[2,3-b]phthalazine-5-(14H), 12(7H)-dione are obtained, M.P. 228–229° C.

*Analysis.*—Calc. for $C_{16}H_{11}FN_2O_2$ (percent): C, 68.08; H, 3.92; N, 9.92; F, 6.73. Found (percent): C, 68.28; H, 4.01; N, 9.70; F, 6.65.

We claim:
1. A process for preparing a phthalazino[2,3-b]phthalazine-5(14H),12(7H)-dione of the formula

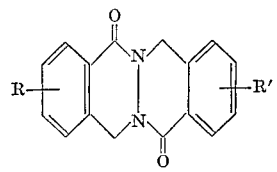

VI wherein R is a member of the class consisting of hydrogen, halogen and nitro, and R' is a member of the class consisting of hydrogen, halogen, nitro and amino, which comprises heating in an organic solvent a 2-bromomethyl-benzoyl chloride of the formula

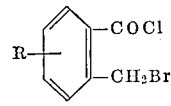

wherein R has the above significance with 1,2-diacetyl-hydrazine, in the presence of an over equimolecular excess of an organic nitrogen tertiary base, splitting off the acetyl groups by hydrolytic cleavage, reacting the obtained 3,4-dihydro-1(2H)-phthalazinone of the following formula

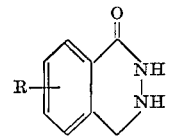

wherein R has the above significance, with an about equimolecular amount of a 2-bromomethyl-benzoyl chloride of the formula

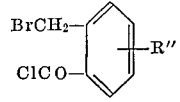

wherein R" is a member of the class consisting of hydrogen, halogen, nitro and acetamido, in the presence of an organic nitrogen tertiary base, whereby the hereinbelow phthalazino-phthalazinedione is formed

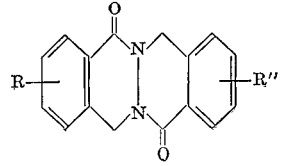

wherein R and R″ have the above significance, and when R″ is acetamido, converting said compound by hydrolytic cleavage into compound VI.

2. A process as in claim 1, wherein the phthalazino-phthalazinedione is phthalazino[2,3-b]phthalazine-5-(14H),12(7H)-dione.

3. A compound of the formula

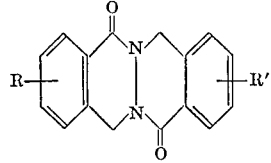

wherein R is a member of the class consisting of hydrogen, halogen and nitro and R′ is a member of the class, consisting of hydrogen halogen, nitro and amino.

4. A compound as in claim 3, wherein the phthalazino-phthalazinedione is phthalazino[2,3-b]phthalazine-5-(14H),12(7H)-dione.

References Cited

Kealy, Jour. American Chem. Soc., vol. 84, pp. 966–973.

NICHOLAS S. RIZZO, Primary Examiner

U.S. Cl. X.R.

424—250